United States Patent [19]
Daudelin

[11] Patent Number: 6,072,807
[45] Date of Patent: Jun. 6, 2000

[54] SEARCHING FOR SIGNALS TO ASSIGN TO THE FINGERS OF A RAKE RECEIVER

[75] Inventor: Douglas Streeter Daudelin, Lincoln Park, N.J.

[73] Assignee: Lucent Technologies, Inc., Murray Hill, N.J.

[21] Appl. No.: 08/987,072

[22] Filed: Dec. 9, 1997

[51] Int. Cl.$^7$ .............................. H04J 15/00; H04J 3/22
[52] U.S. Cl. .................... 370/465; 370/335; 370/350; 370/252; 370/332; 375/200; 375/206; 375/347; 375/349
[58] Field of Search ........................... 370/335, 342, 370/350, 252, 331, 332; 375/200, 206, 347, 349

[56] References Cited

U.S. PATENT DOCUMENTS

| | | | |
|---|---|---|---|
| 5,237,586 | 8/1993 | Bottomley | 375/1 |
| 5,854,785 | 12/1998 | Willey | 370/332 |
| 5,889,768 | 3/1999 | Storm et al. | 370/320 |
| 5,926,503 | 7/1999 | Kelton et al. | 375/100 |
| 5,953,366 | 9/1999 | Naruse et al. | 375/200 |
| 5,956,367 | 9/1999 | Koo et al. | 375/206 |

*Primary Examiner*—Douglas W. Olms
*Assistant Examiner*—Ali A Zamani

[57] ABSTRACT

A technique for searching for signals to assign to the fingers of a rake receiver is disclosed. In particular, some embodiments of the present invention identify signals with some PN sequence offsets as more likely to have signals appear at them than other offsets, and monitor the more promising offsets more closely than the less promising offsets, thus enabling signals to be more quickly discovered and assigned to a finger. One embodiment of the present invention comprises: assigning a signal to a finger of a rake receiver; de-assigning the signal from the finger; searching for the signal with the finger after the signal has been de-assigned from the finger; and re-assigning the signal to the finger, if a measure of signal quality of the signal crosses a threshold.

22 Claims, 4 Drawing Sheets

100

SEARCHING FOR SIGNALS TO ASSIGN TO THE FINGERS OF A RAKE RECEIVER

FIELD OF THE INVENTION

The present invention relates to wireless telecommunications in general, and, more particularly, to a wireless receiver that searches for direct sequence spread spectrum signals to assign to the fingers of a rake receiver.

BACKGROUND OF THE INVENTION

FIG. 1 depicts a schematic diagram of a portion of a typical wireless telecommunications system, which provides wireless telecommunications service to a number of wireless terminals (e.g., wireless terminals 101-1 through 101-3) that are situated within a geographic region. The heart of a typical wireless telecommunications system is Wireless Switching Center ("WSC") 120, which might be also known as a Mobile Switching Center ("MSC") or Mobile Telephone Switching Office ("MTSO"). Typically, Wireless Switching Center 120 is connected to a plurality of base stations (e.g., base stations 103-1 through 103-5) that are dispersed throughout the geographic area serviced by the system and to the local- and long-distance telephone offices (e.g., local-office 130, local-office 138 and toll-office 140). Wireless Switching Center 120 is responsible for, among other things, establishing and maintaining calls between wireless terminals and between a wireless terminal and a wireline terminal, which wireline terminal is connected to Wireless Switching Center 120 via the local and/or long-distance networks.

The geographic area serviced by a wireless telecommunications system is divided into spatially distinct areas called "cells." As depicted in FIG. 1, each cell is schematically represented by a hexagon; in practice, however, each cell has an irregular shape that depends on the topography of the terrain surrounding the cell. Typically, each cell contains a base station, which comprises the radios and antennas that the base station uses to communicate with the wireless terminals in that cell and also comprises the transmission equipment that the base station uses to communicate with Wireless Switching Center 120.

For example, when wireless terminal 101-1 desires to communicate with wireless terminal 101-2, wireless terminal 101-1 transmits the desired information to base station 103-1, which relays the information to Wireless Switching Center 120. Upon receipt of the information, and with the knowledge that it is intended for wireless terminal 101-2, Wireless Switching Center 120 then returns the information back to base station 103-1, which relays the information, via radio, to wireless terminal 101-2.

Typically, the signal transmitted by a wireless terminal to a base station is radiated omni-directionally from the wireless terminal. Although some of the signal that is transmitted radiates in the direction of the base station and reaches the base station in a direct line-of-sight path, if one exists, most of the transmitted signal radiates in a direction other than towards the base station and is never received by the base station. Often, however, signals that radiate initially in a direction other than towards the base station strike an object and are reflected towards, and are received by, the base station. Thus, a signal can radiate from the wireless terminal and be received by the base station via multiple signal paths.

FIG. 2 depicts a schematic illustration of wireless terminal 101-1 as it transmits to base station 103-1. Signal 107-1 is received by base station 103-1 directly. Signal 107-2, signal 107-3, and signal 107-4 arrive at base station 103-1 after radiating initially in a direction other than towards base station 103-1 and only after reflecting off of an object, such as buildings 105-2 through 105-4, respectively. Signals 108-1 through 108-4 radiate from wireless terminal 101-1 but never reach base station 103-1.

Because each of the four signals arrives at base station 103-1 after having traveled a different path, each of the four signals arrives phase-shifted with respect to each other. The phase-shift of each signal is determined by the delay encountered by each signal in traversing its unique path. And furthermore, depending on the length of the path traveled and whether the signal is reflected off an object before reaching base station 103-1, the signal quality (e.g., the average power of an amplitude-modulated signal, the signal-to-noise ratio, absolute power in dBm, etc.) of each signal is different when received. This is partially due to the fact that when a signal is reflected off of an object, the degree to which the signal is attenuated is a function of, among other things, the angle at which the signal is incident to the object and the geometric and dielectric properties of the object.

In a code-division multiple access ("CDMA") wireless telecommunications system, each radio receiver endeavors to identify and isolate the highest-quality constituent signals incident on the receiver and to demodulate and combine them to estimate the transmitted signal. As is well-known in the prior art, this process is conducted with, among other things, a finger-assignor and a rake receiver. The finger-assignor repetitively scans the incoming composite signal, in well-known fashion, and attempts to identify the strongest constituent signals in the composite signal to the rake receiver. It is important to note that the scanning process may take a significant period of time to identify a new constituent signal appearing in the composite signal. This length of time is further aggravated by air-interface protocols (e.g., IS-95, etc.) that transmit in random bursts, because the constituent signal is not visible during scans that occur when the transmitted signal is gated off. The rake receiver isolates and demodulates each of the identified strongest constituent signals, and then combines the demodulation result from each constituent signal, in well-known fashion, to produce a better estimate of the transmitted signal than could be obtained from any single constituent signal. To accomplish this, a rake receiver comprises a plurality, but finite number, of individual receivers, known as "fingers," each of which isolates and demodulates one constituent signal.

As the wireless terminal moves, the relative signal quality and phase-shift of the constituent signals changes, sometimes considerably. Received constituent signals can disappear, new constituent signals can appear, and existing constituent signals can merge or diverge. The signal quality of a constituent signal can suffer radical momentary changes, which make it appear for a time that the constituent signal no longer exists, although it quickly reappears. Such changes can be due to, for example, Rayleigh fading, or the transmitter passing behind an obstruction. A finger can be mistakenly assigned to an apparent signal that is, in fact, noise, or a finger can be assigned to a genuine signal that disappears. These are called spurious signals, and, when assigned to the rake receiver: (1) degrade the quality of the demodulator's output, and (2) take up a finger in the receiver which could otherwise be profitably assigned to a genuine constituent signal.

FIG. 3 depicts a graph of the signal quality as a function of time of a constituent signal that has been assigned to a finger at $t_a$.

A constituent signal can be de-assigned for various reasons. One reason a constituent signal might be de-assigned is that it is to be replaced with a constituent signal of apparently higher quality. Another reason is that the de-assigned constituent signal might have been determined to have become spurious. According to prior art, the constituent signal in FIG. 3 is de-assigned at time $t_d$ for this latter reason because its signal quality fell below the rejection threshold, R, for time $t_r$.

A rake receiver will offer the best performance when its fingers are, at every instant, demodulating the best constituent signals, and not other signals. Therefore, the need exists for techniques that ensure that genuine constituent signals are found and utilized in the coherent combination process as quickly as possible, and that de-graded and spurious signals are removed as quickly as possible.

SUMMARY OF THE INVENTION

Some embodiments of the present invention are capable of searching for signals to assign to the fingers of a rake receiver without some of the costs and disadvantages of techniques in the prior art. In particular, some embodiments of the present invention: (1) endeavor to estimate at what PN sequence offsets a genuine constituent signal is likely to appear, and (2) dedicate resources to look for a signal at those offsets. This is advantageous because some embodiments of the present invention are capable of detecting good constituent signals more quickly than receivers in the prior art, and, therefore, of having, on average, a better estimate of the transmitted signal than receivers in the prior art.

Because the degradation of a signal that has been assigned to a finger could be caused by a temporary obstruction in the signal path of the constituent signal, some embodiments of the present invention consider the PN sequence offset associated with a recently de-assigned signal to be a likely offset for a signal to appear. In this case, the finger from which the signal was recently de-assigned, or a "fingertip" in accordance with the illustrative embodiment, can be used to search for the signal.

Additionally, a statistical analysis of the offsets associated with the most recently assigned genuine signals can provide an indication of the offsets on which a genuine constituent signal is likely to appear. In this case a finger or fingertip could be used to search the range of offsets in which the signal is likely to appear. In either case, the finger or fingertip is likely to notice the appearance of a good constituent signal before the searcher does, and, therefore, the signal can be assigned to a finger and added to the combination process more quickly than in the prior art.

An illustrative embodiment of the present invention comprises: assigning a signal to a finger of a rake receiver; de-assigning the signal from the finger; searching for the signal with the finger after the signal has been de-assigned from the finger; and re-assigning the signal to the finger, if a measure of signal quality of the signal crosses a threshold.

DETAILED DESCRIPTION

Figure 1:
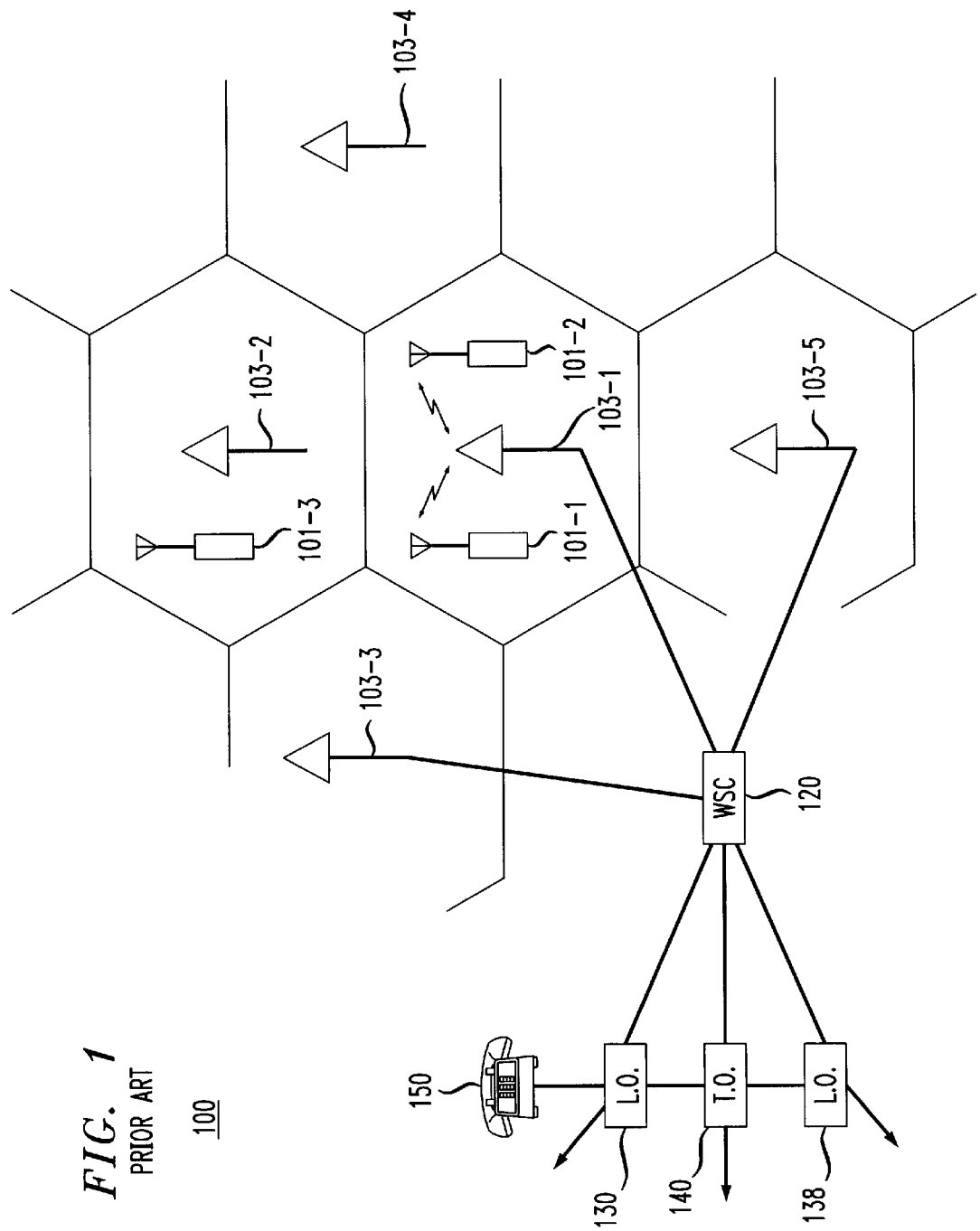
FIG. 1 depicts a schematic drawing of a wireless telecommunications system in the prior art.
Figure 2:
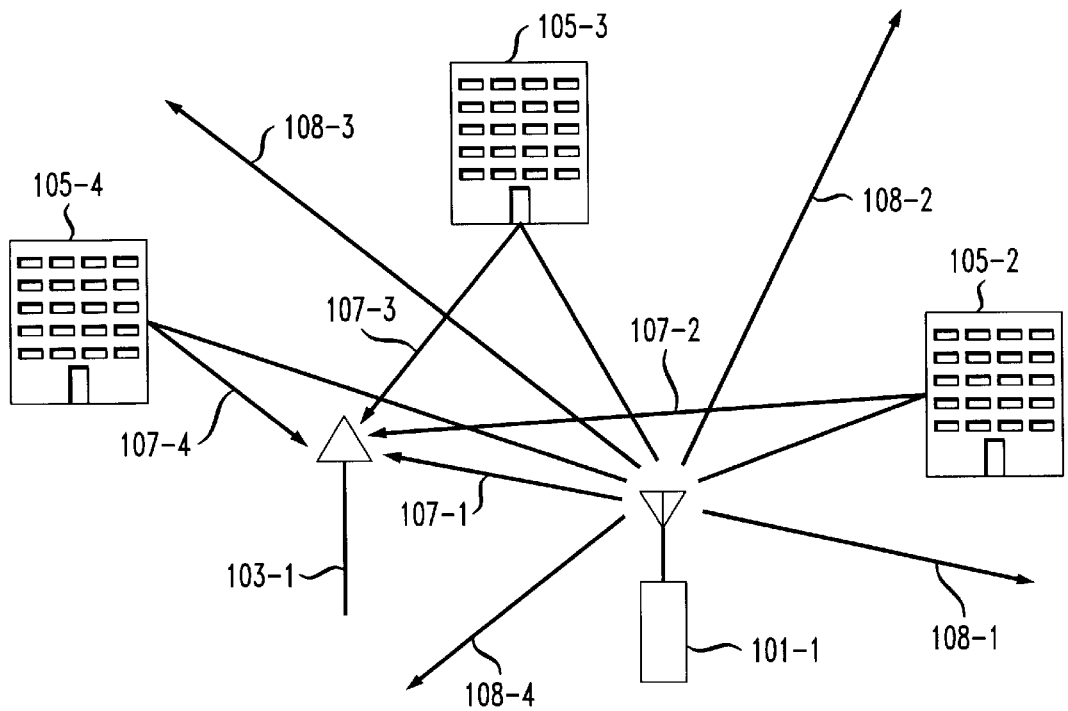
FIG. 2 depicts a schematic drawing of a wireless base station receiving a multipath signal transmitted by a wireless terminal in the prior art.
Figure 3:
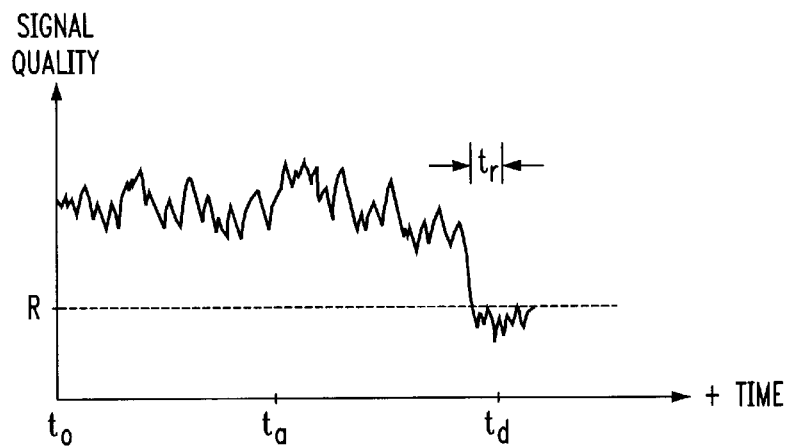
FIG. 3 depicts a graph of an illustrative constituent signal and the temporal and signal quality thresholds that govern the use and de-assigning of the illustrative constituent signal.
Figure 4:
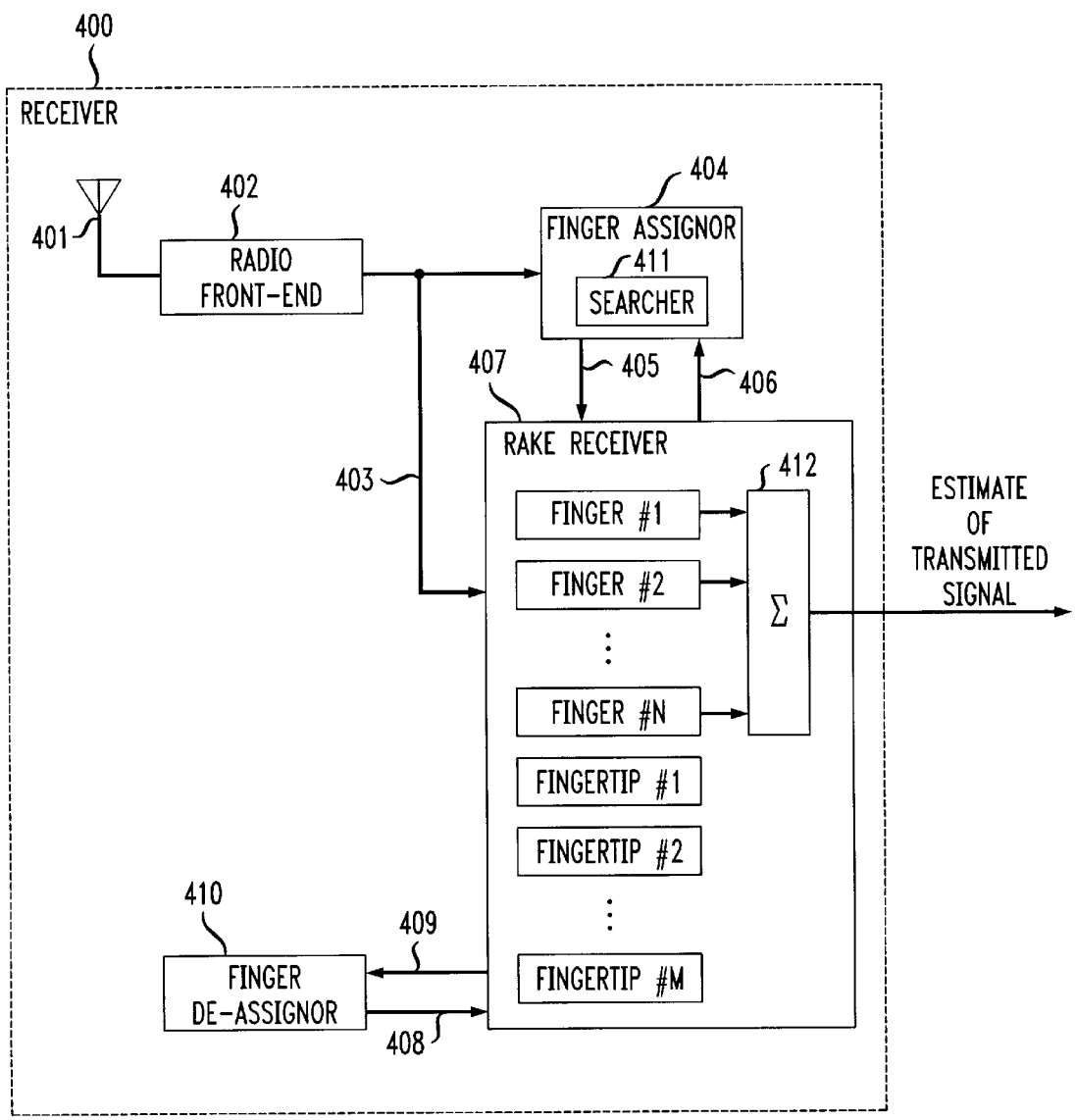
FIG. 4 depicts a block diagram of a receiver in accordance with an illustrative embodiment of the present invention.

FIG. 4 depicts a block diagram of the salient components of receiver 400 in accordance with the illustrative embodiment of the present invention. Receiver 400 can be either in a wireless base station or in a wireless terminal and advantageously receives and processes direct sequence spread spectrum signals transmitted as part of a code-division multiple access ("CDMA") telecommunications system.

Receiver 400 illustratively comprises: antenna 401, radio front-end 402, finger assignor 404, rake receiver 407 and finger de-assignor 410. Antenna 401 advantageously receives a composite multipath signal, in well-known fashion, and radio front-end 402 amplifies and down-converts it, also in well-known fashion. The composite signal leaves radio front-end 402 and is received by: (1) finger assignor 404 and (2) rake receiver 407.

Finger assignor 404, rake receiver 407 and finger de-assignor 410 are depicted in FIG. 4 as separate and distinct elements for pedagogical purposes so that the differences in the functions they perform can be highlighted. It will be clear to those skilled in the art, however, that in practice the three can be implemented in special-purpose hardware (e.g., an application specific integrated circuit, etc.) as one, two or three modules, or as different routines in an appropriately-programmed general-purpose processor, or as a combination of the two.

Finger assignor 404 advantageously comprises searcher 411, which searches for signals to be assigned to a finger in rake receiver 407, in well-known fashion. In accordance with the illustrative embodiment, any signal that can be received by receiver 400 is spread at the transmitter by a deterministic pseudo-noise ("PN") sequence and is associated at the receiver with an offset, in a linear sequence of offsets, of that PN sequence, in well known fashion.

Rake receiver 407 advantageously comprises N fingers, in well-known fashion, M fingertips, and combiner 412, which produces the estimate of the transmitted signal. It will be clear to those skilled in the art how to choose values for N and M for a given embodiment of the present invention. Rake receiver 407 advantageously receives, in well-known fashion, as its inputs:

(1) the composite signal on lead 403, (2) orders from finger assignor 404 to assign a signal to a finger, and (3) orders from finger de-assignor 410 to de-assign a signal from a finger.

In accordance with the illustrative embodiment of the present invention, each finger in rake receiver 407 is, at any moment, in one of three mutually-exclusive states:

(1) Inactive, (2) Assigned, or (3) Reserved.

Figure 5:
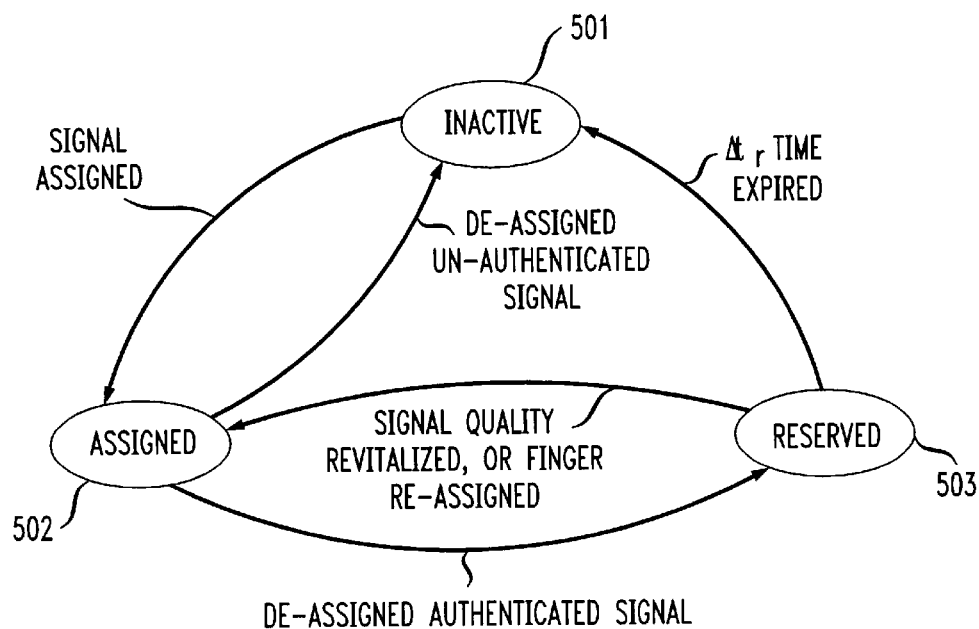
FIG. 5 depicts a state diagram of the finger states in an illustrative embodiment of the present invention.

FIG. 5 depicts a state-transition diagram that describes the three states and their interrelationship in accordance with the illustrative embodiment and describes the events and conditions that determine when a finger changes from one state to another.

The initial state for a finger is the inactive state (state 501). When a finger is in the inactive state, it is idle, in well-known fashion. Then, when finger assignor 404 identifies an apparent constituent signal and assigns the constituent signal to the finger, the finger leaves the inactive state and enters the assigned state (state 502).

When a finger is in the assigned state, the finger demodulates the assigned signal and monitors its signal quality, in well-known fashion, and outputs the demodulated signal to combiner 412, pursuant to well-known safeguards. If the constituent signal demonstrates its authenticity in some manner, then when the signal is eventually de-assigned from the finger, the finger leaves the assigned state and enters the reserved state (state 503). Alternatively, if the constituent signal fails to demonstrate its authenticity, then when the signal is eventually de-assigned from the finger, the finger leaves the assigned state and enters the inactive state (state 501).

The signal could demonstrate its authenticity, for example, by surviving a probationary period, $\Delta t_p$, while assigned to the finger or by having a sufficiently high signal quality, SQ(t), while assigned to the finger or by a function of both. It will be clear to those skilled in the art how to devise many suitable tests for testing the authenticity of a signal.

When the finger is in the reserved state, the finger searches for the signal that was last deassigned from the finger. In particular, because the signal was associated with a given offset before the signal was de-assigned from the finger, the finger can either search for the signal: (1) only in that offset, or (2) in a contiguous range of offsets in proximity to and containing the given offset. For example, if the search space for all signals is a linear sequence of 1023 offsets numbered #1 through #1023, and an assigned signal is associated with offset #734 before it is de-assigned, then the finger could search for the re-appearance of that signal in either: (1) only offset #734, or (2) in a range of offsets in proximity to #734 (e.g., #709 through #759).

The signal can be, but need not be, demodulated by the finger when it is in the reserved state. If the signal is demodulated, it is advantageously not included in the combination process. If the signal quality of the monitored signal revitalizes within a period of time called the reserved period, $\Delta t_r$, finger assignor 404 advantageously re-assigns the signal to the finger immediately and the finger re-enters the assigned state (state 502). If the signal quality of the monitored signal fails to revitalize within the reserved period, $\Delta t_r$, the finger re-enters the inactive state (state 501).

If another apparent constituent signal is found by finger assignor 404, and there is no finger in the inactive state to which to assign it, the new signal will be assigned to a finger in the reserved state. Should this happen, one of the M fingertips in rake receiver 407 can be assigned to continue the search for the signal at the likely offsets for the duration of the reserved period, $\Delta t_r$. A fingertip is capable of searching for a signal in an offset, or, alternatively, in a contiguous range of offsets, but is not capable of the full functionality associated with a finger. The output of a fingertip is never output to combiner 412.

As will be clear to those skilled in the art, a fingertip functions similarly to the searcher in the finger assignor, but whereas the searcher must scan the entire range of possible offsets, the fingertip, in contrast, is dedicated to searching a single offset or a contiguous range of offsets that is smaller than the entire search space of possible offsets. Either a dedicated fingertip, or an otherwise inactive finger, or a combination of the two, can be used to monitor the likely offset(s).

It is more advantageous to use either a dedicated fingertip or an inactive finger to search for a signal that is believed likely to appear than it is to rely on the searcher in the finger assignor alone, because the dedicated fingertip or finger is more likely to notice the appearance of the signal more quickly than the searcher, which typically searches through the entire sequence of offsets linearly (i.e., from beginning to end).

Alternatively, a fingertip (or an otherwise inactive finger) could be assigned at any time to search for a signal that has not yet appeared, or been assigned to a finger, but is for some reason, believed likely to appear. In this case, the fingertip can be assigned to search for the signal: (1) in only one offset, or (2) in a specific set of offsets.

Advantageously, the reserved period, $\Delta t_r$, is measured from the time the finger enters the reserved state, and the duration of the reserved period, $\Delta t_r$, could be invariant or a function of the signal quality, SQ(t), during the reserved period, $\Delta tr_r$. The criteria for determining whether a signal's quality revitalizes will be discussed below.

Finger assignor 404 advantageously receives as its inputs:
(1) the composite signal on lead 403; and
(2) an indication from rake receiver 407 of:
  (a) which fingers are inactive,
  (b) which fingers are assigned,
  (c) which fingers are reserved, and if reserved, an indication of how long each has been in the reserved state,
  (d) the signal quality of each constituent signal that is assigned to a finger, and
  (e) the signal quality of each constituent signal observed by a reserved finger or a fingertip.

Finger assignor 404 advantageously: (1) analyzes the composite signal and searches for strong constituent signals that are appropriate to assign to a finger, in well-known fashion, and (2) compares the signal quality of each constituent signal observed by a reserved finger against a "re-assignment threshold," $T_r$, in parallel.

When finger assignor 404 locates a suitable constituent signal that it desires to assign to a finger, the signal is advantageously assigned to one of the fingers in the inactive state rather than to one of the fingers in the reserved state. If no fingers are in the inactive state, then the signal is advantageously assigned to the finger that has been in the reserved state for the longest duration of all of the fingers in the reserved state.

When finger assignor 404 determines that a measure of signal quality of a constituent signal, SQ(t), observed by a reserved finger crosses the re-establishment threshold, $T_r$, then that constituent signal is advantageously re-assigned to that finger. Thereafter, the finger processes the re-assigned constituent signal in well-known fashion.

Although the re-establishment threshold, $T_r$, can be invariant, advantageously it changes as a function of time. In particular, the re-establishment threshold, $T_r$, advantageously changes as a function of the duration that the signal has been de-assigned from the associated finger. For example, the re-establishment threshold, $T_r$, can increase logarithmically from $T_1$ towards $T_1+T_2$:

$$T_r = T_1(1-e^{(-t/\tau_c)}) + T_2 \qquad \text{(Eq. 1)}$$

where t is measured from when the signal was de-assigned, and $\tau_c$ is the logarithmic time-constant. Advantageously, the reserved period, $\Delta t_r$, equals $5\tau_c$.

Alternatively, the re-establishment threshold, $T_r$, can increase in discrete steps according to a schedule that is dependent or independent of the measure of signal quality of the observed constituent signal.

Finger de-assignor 410 advantageously receives as its inputs: (1) an indication from rake receiver 407 of which fingers are currently assigned, and (2) an indication of the signal quality of each assigned constituent signal. Finger de-assignor 410 advantageously analyzes the assigned constituent signals and determines when one or more of the assigned constituent signals is spurious (e.g., by having its signal quality, SQ(t), fall below a de-assignment threshold, $T_D$, etc.). When finger de-assignor 410 determines that an assigned constituent signal is spurious, then finger de-assignor 410 orders rake receiver 407 to de-assign the signal from the associated finger. As stated above, if the constituent signal has demonstrated its authenticity in some manner, then the finger leaves the assigned state and enters the reserved state. Alternatively, if the constituent signal has failed to demonstrate its authenticity, then the finger leaves the assigned state and enters the inactive state.

It will be clear to those skilled in the art that embodiments of the present invention can de-assign a signal from a finger for other reasons, in well-known fashion, in addition to that of determining that an assigned constituent signal is spurious.

Figure 6:
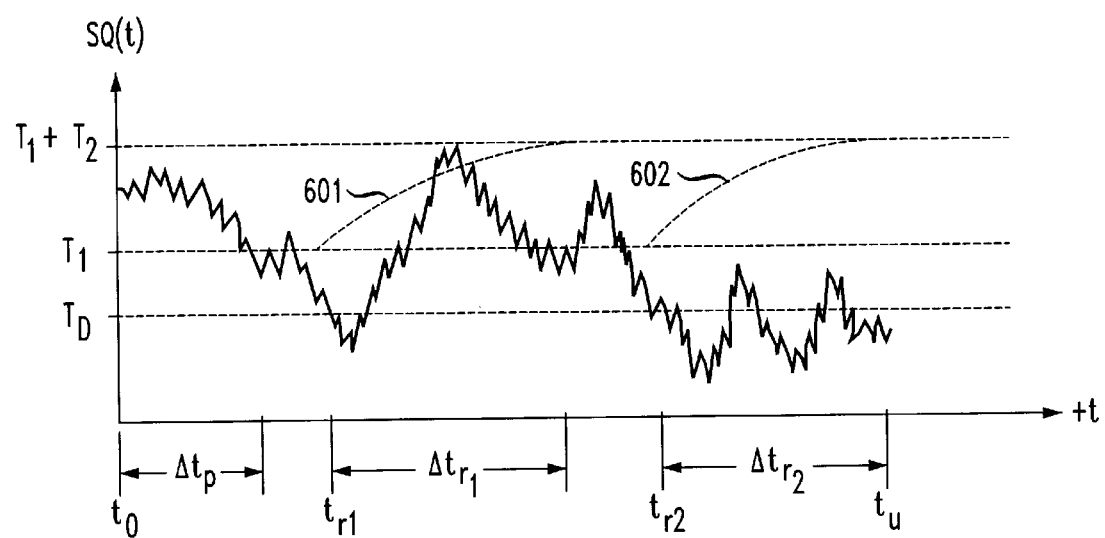
FIG. 6 depicts a graph of the signal quality, SQ(t), of an illustrative constituent signal as a function of time.

FIG. 6 depicts a graph of the signal quality, SQ(t), of an illustrative constituent signal as a function of time, which signal has been assigned to a finger for the first time at time $t_0$.

Referring to FIG. 6, the signal quality, SQ(t), of the illustrative constituent signal remains above the de-assignment threshold, $T_D$, through the probationary period, $\Delta t_p$, and, therefore, when the signal is de-assigned, the finger will enter the reserved state.

Shortly after the probationary period ends, at time $t=t_{r1}$, the signal quality, SQ(t), of the illustrative constituent signal drops below the de-assignment threshold, $T_D$, and the signal is de-assigned from the finger, the finger enters the reserved state, and the reserved period, $\Delta t_{r1}$, begins. At time $t=t_{r1}$, re-establishment threshold 601 increases logarithmically from $T_1$ towards $T_1+T_2$, from the beginning of the reserved period, $\Delta t_{r1}$. As can be seen in FIG. 6, the signal quality, SQ(t), of the illustrative constituent signal rises above re-establishment threshold 601 approximately half-way through the reserved period, $\Delta t_{r1}$, and, therefore, the signal is re-assigned to the finger and the finger re-enters the assigned state.

Later, at time $t=t_{r2}$, the signal quality, SQ(t), of the illustrative constituent signal drops below the de-assignment threshold, $T_D$, again, and the signal is de-assigned again, the finger enters the reserved state again, and a second reserved period, $\Delta t_{r2}$, begins. But because the signal quality, SQ(t), of the illustrative constituent signal never rises above re-establishment threshold 602 during the reserved period, $\Delta t_{r2}$, the finger enters the inactive state at time $t=t_u$.

It is to be understood that the above-described embodiments are merely illustrative of the invention and that many variations might be devised by those skilled in the art without departing from the scope of the invention. It is therefore intended that such variations be included within the scope of the following claims and their equivalents.

What is claimed is:

1. A method comprising:
    assigning a signal to a finger of a rake receiver;
    de-assigning said signal from said finger;
    searching for said signal with said finger after said signal has been de-assigned from said finger; and
    re-assigning said signal to said finger, if a measure of signal quality of said signal crosses a threshold within a reserved period.

2. The method of claim 1 wherein said signal was associated with a first offset in a linear sequence of offsets when said signal was assigned to said finger, and said finger searches for said signal only in said first offset.

3. The method of claim 1 wherein said signal was associated with a first offset in a linear sequence of offsets when said signal was assigned to said finger, and said finger searches for said signal in a range of offsets that contains said first offset, and wherein said range of offsets contains less than one-half of the offsets of said linear sequence of offsets.

4. The method of claim 1 further comprising classifying said finger as in an inactive state, if a measure of signal quality of said signal fails to cross said threshold within said reserved period.

5. The method of claim 1 further comprising searching for said signal with a fingertip, if said finger is assigned to a second signal during said reserved period.

6. The method of claim 5 wherein said signal was associated with a first offset in a linear sequence of offsets when said signal was assigned to said finger, and said fingertip searches for said signal only in said first offset.

7. The method of claim 5 wherein said signal was associated with a first offset in a linear sequence of offsets when said signal was assigned to said finger, and said fingertip searches for said signal only in a range of offsets that contains said first offset, and wherein said range of offsets contains less than one-half of the offsets of said linear sequence of offsets.

8. The method of claim 1 wherein said threshold changes as a function of time.

9. The method of claim 8 wherein said threshold changes as a function of the duration that said signal has been de-assigned from said finger.

10. The method of claim 9 wherein said threshold increases in discrete steps as a function of the duration that said signal has been de-assigned from said finger.

11. An apparatus comprising:
    means for assigning a signal to a finger of a rake receiver;
    means for de-assigning said signal from said finger;
    said finger for searching for said signal after said signal has been de-assigned from said finger; and
    means for re-assigning said signal to said finger, if a measure of signal quality of said signal crosses a threshold within a reserved period.

12. The apparatus of claim 11 wherein said signal was associated with a first offset in a linear sequence of offsets when said signal was assigned to said finger, and said finger searches for said signal only in said first offset.

13. The apparatus of claim 11 wherein said signal was associated with a first offset in a linear sequence of offsets when said signal was assigned to said finger, and said finger searches for said signal in a range of offsets that contains said first offset, and wherein said range of offsets contains less than one-half of the offsets of said linear sequence of offsets.

14. The apparatus of claim 13 wherein said finger is classified as in an inactive state, if a measure of signal quality of said signal fails to cross said threshold within said reserved period.

15. The apparatus of claim 13 further comprising a fingertip for searching for said signal with a fingertip, if said finger is assigned to a second signal during said reserved period.

16. The apparatus of claim 15 wherein said signal was associated with a first offset in a linear sequence of offsets when said signal was assigned to said finger, and said fingertip searches for said signal only in said first offset.

17. The apparatus of claim 15 wherein said signal was associated with a first offset in a linear sequence of offsets when said signal was assigned to said finger, and said fingertip searches for said signal only in a range of offsets that contains said first offset, and wherein said range of offsets contains less than one-half of the offsets of said linear sequence of offsets.

18. The apparatus of claim 11 wherein said threshold changes as a function of time.

19. The apparatus of claim 18 wherein said threshold changes as a function of the duration that said signal has been de-assigned from said finger.

20. The apparatus of claim 19 wherein said threshold decreases in discrete steps as a function of the duration that said signal has been de-assigned from said finger.

21. A method comprising:

searching for a signal in a contiguous range of offsets that is a subset of a linear sequence of offsets with a first finger, wherein said range of offsets contains less than one-half of the offsets in said linear sequence of offsets; and assigning said signal to a second finger, if a measure of signal quality of said signal crosses a threshold.

22. The method of claim 21 wherein said first finger is said second finger.

* * * * *